United States Patent
Ramle et al.

(10) Patent No.: US 11,006,361 B2
(45) Date of Patent: May 11, 2021

(54) CORE NETWORK SIGNALING CONTROL

(71) Applicant: Telefonaktiebolaget LM Ericsson (publ), Stockholm (SE)

(72) Inventors: Peter Ramle, Mölnlycke (SE); Anders Bränneby, Järfälla (SE); Ulf Larsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 16/080,318

(22) PCT Filed: Mar. 8, 2016

(86) PCT No.: PCT/EP2016/054862
§ 371 (c)(1),
(2) Date: Aug. 28, 2018

(87) PCT Pub. No.: WO2017/152949
PCT Pub. Date: Sep. 14, 2017

(65) Prior Publication Data
US 2019/0090186 A1    Mar. 21, 2019

(51) Int. Cl.
*H04W 52/02*    (2009.01)
*H04W 8/22*    (2009.01)
(Continued)

(52) U.S. Cl.
CPC ......... *H04W 52/0216* (2013.01); *H04W 4/70* (2018.02); *H04W 8/22* (2013.01);
(Continued)

(58) Field of Classification Search
CPC ......... H04W 52/0216; H04W 52/0225; H04W 4/70; H04W 52/0251; H04W 76/27;
(Continued)

(56) References Cited

U.S. PATENT DOCUMENTS

2013/0260810 A1*  10/2013  Rayavarapu .......... H04W 76/19
                                                            455/509
2014/0050084 A1*   2/2014  Cheng ..................... H04W 4/70
                                                            370/230
(Continued)

FOREIGN PATENT DOCUMENTS

EP        2385657 A1    11/2011

OTHER PUBLICATIONS

International Search Report and Written Opinion of the International Searching Authority, PCT/EP2016/054862, dated Nov. 4, 2016, 11 pages.
(Continued)

*Primary Examiner* — Kevin C. Harper
*Assistant Examiner* — Derrick V Rose
(74) *Attorney, Agent, or Firm* — Sage Patent Group

(57) ABSTRACT

Systems and methods relating to a core network detection mechanism for detecting abnormal signaling patterns for signaling aimed at wireless devices (e.g., low-power consumption wireless devices such as low-power consumption Machine Type Communication (MTC) devices) are disclosed. In some embodiments, a method of operation of a core network node in a cellular communications network comprises receiving signaling aimed at a wireless device, detecting, via a detection mechanism, an abnormal signaling pattern based on the signaling, and taking one or more actions upon detecting an abnormal signaling pattern. In this manner, an action(s) may be made to mitigate increased power consumption at the wireless device due to abnormal signaling.

22 Claims, 5 Drawing Sheets

(51) Int. Cl.
  *H04W 76/27* (2018.01)
  *H04W 4/70* (2018.01)
(52) U.S. Cl.
  CPC ... *H04W 52/0225* (2013.01); *H04W 52/0251* (2013.01); *H04W 76/27* (2018.02); *Y02D 30/70* (2020.08)
(58) Field of Classification Search
  CPC ..... H04W 8/22; Y02D 70/1262; Y02D 70/21; Y02D 70/24
  See application file for complete search history.

(56) References Cited

U.S. PATENT DOCUMENTS

| | | | | |
|---|---|---|---|---|
| 2014/0334366 | A1* | 11/2014 | Hsu | H04W 52/0225 370/311 |
| 2015/0105089 | A1* | 4/2015 | Zhang | H04W 76/20 455/450 |
| 2015/0264512 | A1 | 9/2015 | Jain et al. | |
| 2016/0381055 | A1* | 12/2016 | Galula | H04L 67/12 726/23 |
| 2018/0176883 | A1* | 6/2018 | Fujishiro | H04W 68/02 |

OTHER PUBLICATIONS

3rd Generation Partnership Project; Technical Specification Group Services and System Aspects; Study on Machine-Type Communications (MTC) and Other Mobile Data Applications Communications Enhancements (Release 12) 3GPP TR 23.887 V12.0.0 (Dec. 23, 2013), XP050764436, 151 pages.

3rd Generation Partnership Project; Technical Specification Group Services and System Aspects; Architecture Enhancements to Facilitate Communications With Packet Data Networks and Applications (Release 13) 3GPP TS 23.682 V13.5.0 (Mar. 2016), XP051086077, 89 pages.

"IoT Security Guidelines Endpoint Ecosystem," Official Document CLP.13, Version 1.0, Feb. 8, 2016, 83 pages.

* cited by examiner

CORE NETWORK SIGNALING CONTROL

CROSS REFERENCE TO RELATED APPLICATIONS

This application is a 35 U.S.C. § 371 national stage application of PCT International Application No. PCT/EP2016/054862 filed on Mar. 8, 2016, the disclosure and content of which is incorporated by reference herein in its entirety.

TECHNICAL FIELD

The present disclosure relates to low power consumption wireless devices (e.g., low power consumption Machine Type Communication (MTC) devices) and, in particular, to a core network detection mechanism for detecting abnormal signaling aimed at the low power consumption wireless device that could increase power consumption of the low power consumption wireless device.

BACKGROUND

For Machine Type Communication (MTC), there are use cases where it is almost impossible to replace or recharge the battery of the MTC device. For example, for MTC devices such as those used for animal tracking and cargo tracking, it is not desirable to either replace or recharge the battery, particularly during the transport period. For other use cases involving a large number of MTC devices without an external power supply (e.g., battery powered gas meters), it could be rather expensive to replace or recharge the batteries of all of the MTC devices.

In other use cases, the batteries of MTC devices could be replaced or charged, but a long battery lifetime is still desirable or needed for the particular application. For example, MTC devices have been proposed for tracking elderly people who have memory issues, tracking children, and tracking pets. In these use cases, the batteries of the MTC devices could potentially be replaced or charged; however, considering the worst-case scenario of the person, child, or pet going missing, the MTC devices should have very low power consumption and thus a very long battery life in order to provide sufficient time for the person, child, or pet to be found. MTC devices are already used by police for prisoner tracking. Prisoners will not cooperate with police and would wish that the MTC devices have drained batteries and, therefore, extra low power consumption is a required feature for these MTC devices.

For the above reasons, mechanisms that lower the power consumption of MTC devices are desired. Two such mechanisms that have been standardized in Third Generation Partnership Project (3GPP) are extended Discontinuous Reception (eDRX) and Power Saving Mode (PSM). The principles for eDRX and PSM are in short to save energy by letting the eDRX and/or PSM capable User Equipment devices (UEs) only listen to the radio during short periods of time. This also means that the UEs are only susceptible for paging during these short periods.

More specifically, FIG. 1 is a graphical illustration of a Discontinuous Reception (DRX) cycle. As seen from FIG. 1, a UE monitors the Physical Downlink Control Channel (PDCCH) during the DRX ON duration of the DRX cycle. While in DRX mode (i.e., when the UE is in the DRX OFF state), the UE remains in a low-power consumption mode. For DRX, the UE will only periodically monitor the PDCCH and then for only a rather short time. The periodicity at which the UE monitors the PDCCH is decided by the DRX cycle. For each DRX cycle, one Paging Occasion (PO) will occur during which the UE is susceptible for paging. In particular, during the DRX cycle, the UE is operational for a certain period of time when all the scheduling and paging information is transmitted. This period of time is referred to as the DRX ON duration. During the DRX ON duration, the UE is referred to herein as being in the DRX ON state. During another period of time in the DRX cycle, the network (e.g., the enhanced or evolved Node B (eNB) (i.e., the base station) and a core network node such as the Mobility Management Entity (MME)) knows that the UE is completely turned off and is not able to receive anything. This period of time is referred to as the DRX time or DRX OFF duration. Further, during the DRX time, the UE is referred to herein as being in the DRX OFF state, or simply the OFF state. Except when in DRX OFF, the UE radio must be active to monitor PDCCH (e.g., to identify, e.g., paging requests). During DRX OFF, the UE radio can be turned off, and the eNB will not schedule the UE nor will the MME page the UE as they know that the UE radio is not active. The DRX ON duration is defined by an onDurationTimer and, as such, the DRX ON duration is sometimes referred to herein as onDurationTimer. The onDurationTimer specifies the number of consecutive PDCCH subframe(s) at the beginning of a DRX cycle during which the UE is to be in the ON state in order to monitor for a PDCCH transmission. For eDRX, the DRX cycle (sometimes referred to herein as the eDRX cycle) can be as long as 52 minutes. As such, eDRX functionality is an effective way to reduce the UE's battery power usage.

FIG. 2 illustrates PSM as defined by 3GPP. As illustrated, if a PSM-capable UE desires to use PSM, the UE (specifically the UE Non-Access Stratum (NAS)) sends a request to the Mobility Management Entity (MME) of the cellular communications network for an Active Time value and optionally a periodic Tracking Area Update (pTAU) Timer value. If PSM is acceptable for the UE, the MME returns an Active Time value and a pTAU Timer value. Upon transitioning from CONNECTED mode (referred to as ECM_CONNECTED) to IDLE mode (referred to as ECM_IDLE), the UE starts an Active Timer that is set to the Active Time value and a pTAU Timer that is set to the pTAU Timer value received from the MME. The radio of the UE remains active, and the UE performs normal IDLE mode procedures until the Active Timer has expired. Once the Active Timer expires, the UE deactivates the radio of the UE, and the UE enters PSM. During PSM, a Mobile Originating (MO) call can occur, in which case the UE (specifically the US AS) re-activates IDLE mode procedures. Once the pTAU timer expires, the UE (specifically the UE AS) resumes IDLE mode procedures, thereby exiting PSM.

Thus, for PSM, the UE listens to the radio for only a short while (i.e., during the Active Time) after having transitioned from CONNECTED mode to IDLE mode. The UE returns to CONNECTED mode when the UE wishes to send data or when it is time to send a pTAU (and/or periodic Routing Area Update (pRAU)). The UE may also transition back to CONNECTED mode from IDLE mode as a consequence of being paged during its Active Time. To further reduce energy consumption, MTC devices that only send data at certain predefined periods may set the pTAU/pRAU timeout slightly longer than the uplink data time period since this would mean that sending of pTAUs/pRAUs can be omitted, thereby further reducing power consumption.

When using power-saving features such as eDRX and/or PSM, particularly for battery operated MTC devices for which batteries cannot be easily recharged or replaced, it is essential that the calculated lifetime of the batteries of such MTC devices not be considerably reduced.

SUMMARY

Systems and methods relating to a core network detection mechanism for detecting abnormal signaling patterns for signaling aimed at wireless devices (e.g., low-power consumption wireless devices such as low-power consumption Machine Type Communication (MTC) devices) are disclosed. In some embodiments, a method of operation of a core network node in a cellular communications network comprises receiving signaling aimed at a wireless device and detecting, via a detection mechanism, an abnormal signaling pattern based on the signaling. The abnormal signaling pattern is a signaling pattern that would result in an increase in power consumption at the wireless device beyond a predefined power consumption level. The method further comprises, upon detecting an abnormal signaling pattern, taking one or more actions that mitigate power consumption at the wireless device as a result of the abnormal signaling pattern. In this manner, an action(s) may be made to mitigate increased power consumption at the wireless device due to abnormal signaling.

In some embodiments, the detection mechanism is a filtering mechanism. In some embodiments, the detection mechanism is configurable.

In some embodiments, the detection mechanism is a function of at least one characteristic of the wireless device. In some embodiments, the at least one characteristic of the wireless device comprises an International Mobile Station Equipment Identity software version (IMEIsv) of the wireless device or a characteristic that is directly or indirectly related to the IMEIsv of the wireless device. In other embodiments, the at least one characteristic of the wireless device comprises an IMEIsv series of the wireless device or a characteristic that is directly or indirectly related to the IMEIsv series of the wireless device. In some other embodiments, the at least one characteristic of the wireless device comprises an International Mobile Subscriber Identity (IMSI) of the wireless device. In some other embodiments, the at least one characteristic of the wireless device comprises an IMSI series of the wireless device.

In some embodiments, the wireless device is a Power Saving Mode (PSM) capable wireless device, and detecting an abnormal signaling pattern comprises detecting an abnormal signaling pattern in which the wireless device is repeatedly signaled before an Active Time has expired. The Active Time is a configurable period of time that the wireless device keeps a radio of the wireless device active after transitioning from CONNECTED mode to IDLE mode before entering PSM.

In some embodiments, the wireless device is an extended Discontinuous Reception (eDRX) capable wireless device, and detecting an abnormal signaling pattern comprises detecting an abnormal signaling pattern in which the wireless device is repeatedly signaled at Paging Occasions (POs) during multiple eDRX cycles.

In some embodiments, detecting an abnormal signaling pattern comprises counting a number of incoming signaling occurrences (e.g., a number of paging requests) to the wireless device over a measurement period and detecting an abnormal signaling pattern if the number of incoming signaling occurrences to the wireless device over the measurement period is greater than a predefined threshold.

In some embodiments, the signaling aimed at the wireless device comprises any signaling that results in paging the wireless device.

In some embodiments, taking the one or more actions upon detecting an abnormal signaling pattern comprises notifying a network operator of the abnormal signaling pattern detected for the wireless device and/or blocking signaling aimed at the wireless device.

In some embodiments, the wireless device is a PSM capable wireless device. In other embodiments, the wireless device is an eDRX capable wireless device.

In some embodiments, the wireless device is a MTC device.

In some embodiments, the core network node is a Mobility Management Entity (MME).

Embodiments of a core network node are also disclosed. In some embodiments, the core network node comprises a network interface, one or more processors, and memory storing instructions executable by the one or more processors whereby the core network node is operable to: receive, via the network interface, signaling aimed at a wireless device; detect, via a detection mechanism, an abnormal signaling pattern based on the signaling, the abnormal signaling pattern being a signaling pattern that would result in an increase in power consumption at the wireless device beyond a predefined power consumption level; and take one or more actions upon detecting an abnormal signaling pattern, the one or more actions being one or more actions that mitigate power consumption at the wireless device as a result of the abnormal signaling pattern.

In some embodiments, a core network is adapted to operate according to any of the embodiments described herein.

In some embodiments, a core network node comprises means for receiving signaling aimed at a wireless device; means for detecting, via a detection mechanism, an abnormal signaling pattern based on the signaling, the abnormal signaling pattern being a signaling pattern that would result in an increase in power consumption at the wireless device beyond a predefined power consumption level; and means for taking one or more actions upon detecting an abnormal signaling pattern, the one or more actions being one or more actions that mitigate power consumption at the wireless device as a result of the abnormal signaling pattern.

In some embodiments, a core network node comprises a signaling reception module operable to receive signaling aimed at a wireless device; a detection module operable to detect, via a detection mechanism, an abnormal signaling pattern based on the signaling, the abnormal signaling pattern being a signaling pattern that would result in an increase in power consumption at the wireless device beyond a predefined power consumption level; and an action module operable to take one or more actions upon detecting an abnormal signaling pattern, the one or more actions being one or more actions that mitigate power consumption at the wireless device as a result of the abnormal signaling pattern.

In some embodiments, a non-transitory computer readable medium is provided, wherein the non-transitory computer readable medium comprises software instructions that when executed by one or more processors of a core network node of a cellular communications network cause the core network node to: receive signaling aimed at a wireless device; detect, via a detection mechanism, an abnormal signaling pattern based on the signaling, the abnormal signaling pattern being a signaling pattern that would result in an increase in power consumption at the wireless device beyond a predefined power consumption level; and take one or more actions upon detecting an abnormal signaling pattern, the one or more actions being one or more actions that mitigate power consumption at the wireless device as a result of the abnormal signaling pattern.

In some embodiments, a computer program is provided, the computer program comprising instructions which, when executed on at least one processor, cause the at least one processor to carry out the method of operation of a core network node according to any of the embodiments described herein. In some embodiments, a carrier is provided, the carrier containing the aforementioned computer program, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
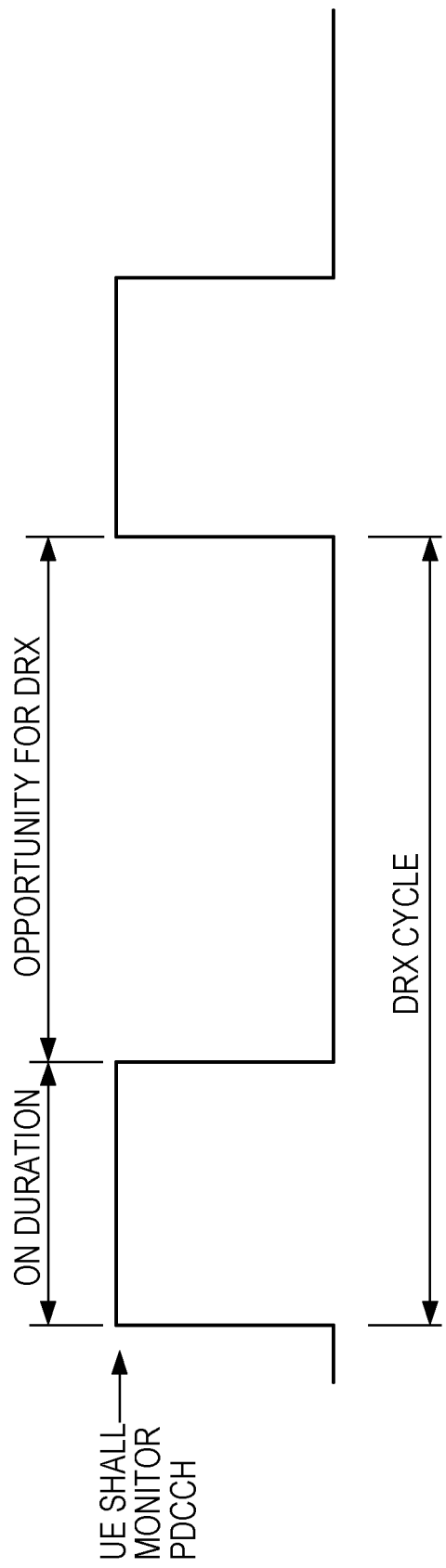
FIG. 1 illustrates a Discontinuous Reception (DRX) cycle.
Figure 2:
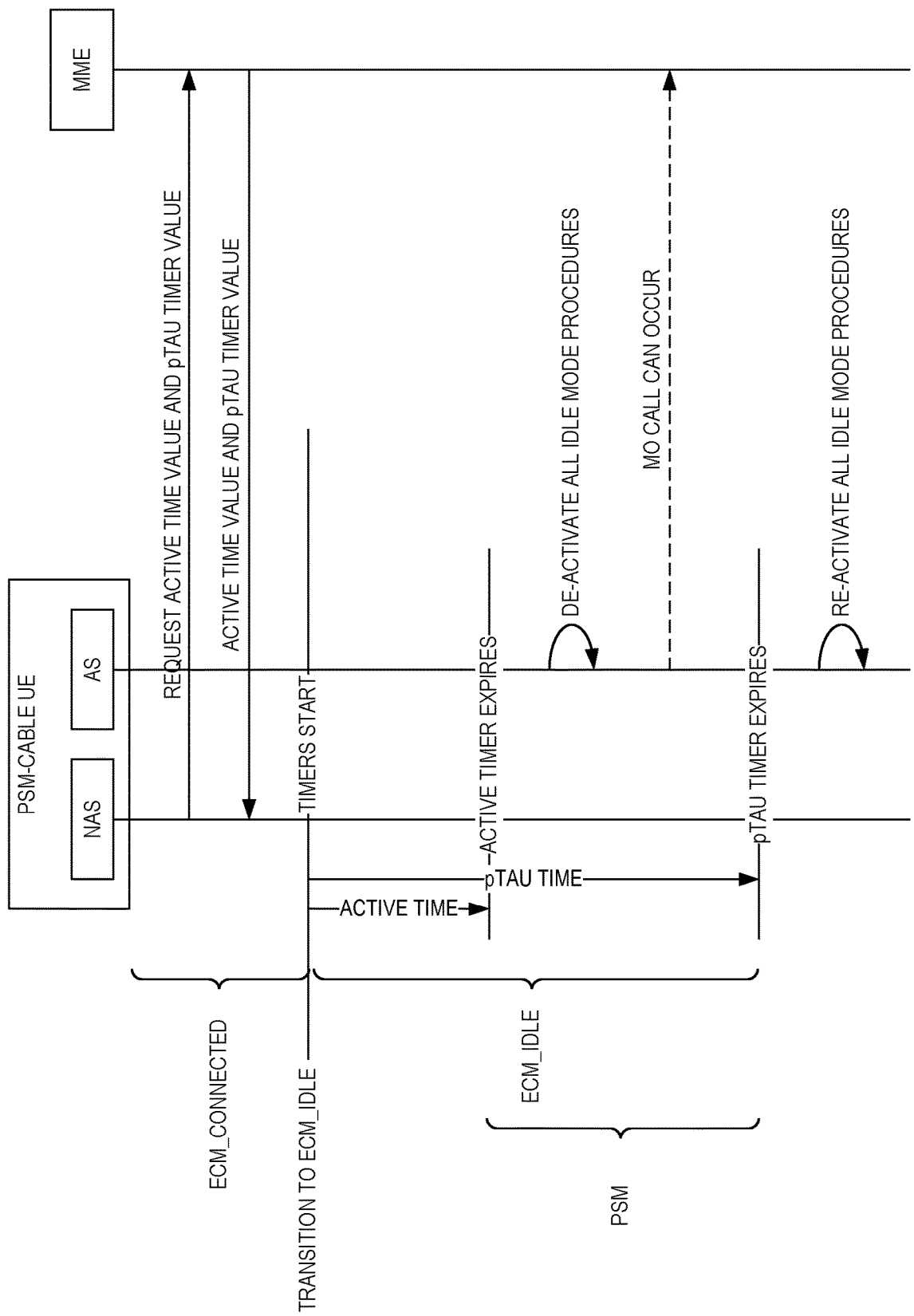
FIG. 2 illustrates a Power Saving Mode (PSM) of a wireless device in a cellular communications network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), a relay node, a Base Station Controller (BSC), and a Radio Network Controller (RNC).

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network or a Wideband Code Division Multiple Access (WCDMA) network, a Machine Type Communication (MTC) device, a Mobile Station (MS) in a Global System for Mobile Communications (GSM) network.

Network Node: As used herein, a "network node" is any node that is either part of the radio access network or the core network of a cellular communications network/system.

MTC Device: As used herein, a MTC device is one type of wireless device that provides MTC. Some examples of MTC devices are, but are not limited to, tracking devices (e.g., person/prisoner/child/pet/item tracking devices), meters (e.g., gas meters), an Internet of Things (IoT) device, or the like.

Low Power Consumption Device: As used herein, a low power consumption device is a type of wireless device (e.g., a low-power consumption MTC device) that is normally battery operated and that includes the capability or ability to utilize one or more power savings features such as, for example, a Power Saving Mode (PSM) and/or extended Discontinuous Reception (eDRX).

Note that the description given herein focuses on a 3GPP cellular communications system and, as such, 3GPP LTE terminology or terminology similar to 3GPP LTE terminology is oftentimes used. However, the concepts disclosed herein are not limited to 3GPP LTE (e.g., may be used in other types of network such as, for, example, a GSM network or a WCDMA network).

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

As discussed above in the Background, for many applications, it is essential that the energy consumption of MTC devices is not increased such that the actual battery lifetime of the MTC devices is not significantly reduced from the calculated, or expected, battery lifetime of the MTC devices. Power consumption of a MTC device is highly dependent on the percentage of time that the MTC device has activated its receiver to monitor for downlink transmissions (e.g., monitor the Physical Downlink Control Channel (PDCCH) for paging requests) as well as the amount of data that the MTC device has to transmit (e.g., the number of paging responses).

For PSM, if someone or something in the network repeatedly signals the MTC device before the Active Time expires (thus repeatedly resetting the Active Time timer), then this signaling could drain the battery of the MTC device much faster than what was expected. Thus, MTC devices such as, for example, fire alarms or personal health monitoring devices could be drained of battery long before expected. In particular, repeated signaling (e.g., paging) to the MTC device before the Active Time has expired (and thus before the MTC device has entered PSM) would cause the MTC device to remain active to listen for downlink transmissions and may also require the MTC device to send paging responses and possibly perform security functions. As security functions will generate execution of cryptographic operations, this may further decrease the battery lifetime of the MTC device.

For eDRX, if someone or something in the network sends data to the MTC device at each Paging Occasion (PO), the MTC device will be paged and thus forced to answer with a paging response, which will drain the battery of the MTC device more quickly than expected. Furthermore, paging may result in the MTC device needing to perform security functions. Again, as security functions will generate execution of cryptographic operations which generally are computationally expensive, this may further decrease the battery lifetime of the MTC device.

The root cause of the problem could be malicious behavior (e.g., someone with the intention to stop prisoner tracking MTC devices) or it could be badly implemented MTC applications. As noted in GSM Association, "IoT Security Guidelines Endpoint Ecosystem," Official Document CLP.13, Version 1.0, Feb. 8, 2016, constraints in processing power and memory of MTC devices and the need for low cost MTC devices may lead to the MTC device only being able to perform lightweight cryptographic operations. This fact may enable malicious users to intercept and decrypt communication streams over public networks and learn how to access the MTC device. It is also quite likely that if cryptographic protection is broken, reverse engineering of the protocols will be possible, and also spoofing will be more accurate. Thus, Internet Protocol (IP) address based whitelists in operator networks may not sufficiently address the aforementioned problem.

Systems and methods relating to a core network detection mechanism for detecting abnormal signaling patterns for signaling aimed at wireless devices (e.g., low-power consumption wireless devices such as low-power consumption MTC devices) are disclosed. In general, abnormal signaling patterns are signaling patterns that would increase power consumption of the low-power consumption wireless devices beyond what is expected (i.e., would increase power consumption of the low-power consumption wireless device beyond a predefined power consumption level). For instance, if a wireless device is expected to have a battery lifetime of 5 years under the expected, or normal, operation, then an abnormal signaling pattern is one which would decrease the battery lifetime of the wireless device to something significantly less than the expected battery lifetime of 5 years. As one particular example, if the wireless device is expected to be paged infrequently (e.g., once a day) but a signaling pattern that results in frequent paging of the wireless device (e.g., once every DRX cycle) is detected, then the detected signaling pattern is an abnormal signaling pattern. Upon detecting an abnormal signaling pattern for signaling aimed at, or directed to, a particular low-power consumption wireless device, one or more actions are taken such as, for example, notifying the network operator and/or blocking the abnormal signaling. Note that while the discussion herein focuses on low-power consumption wireless devices in general and low-power consumption MTC devices in particular, the concepts disclosed herein are more generally applicable to any type of wireless device.

Figure 3:
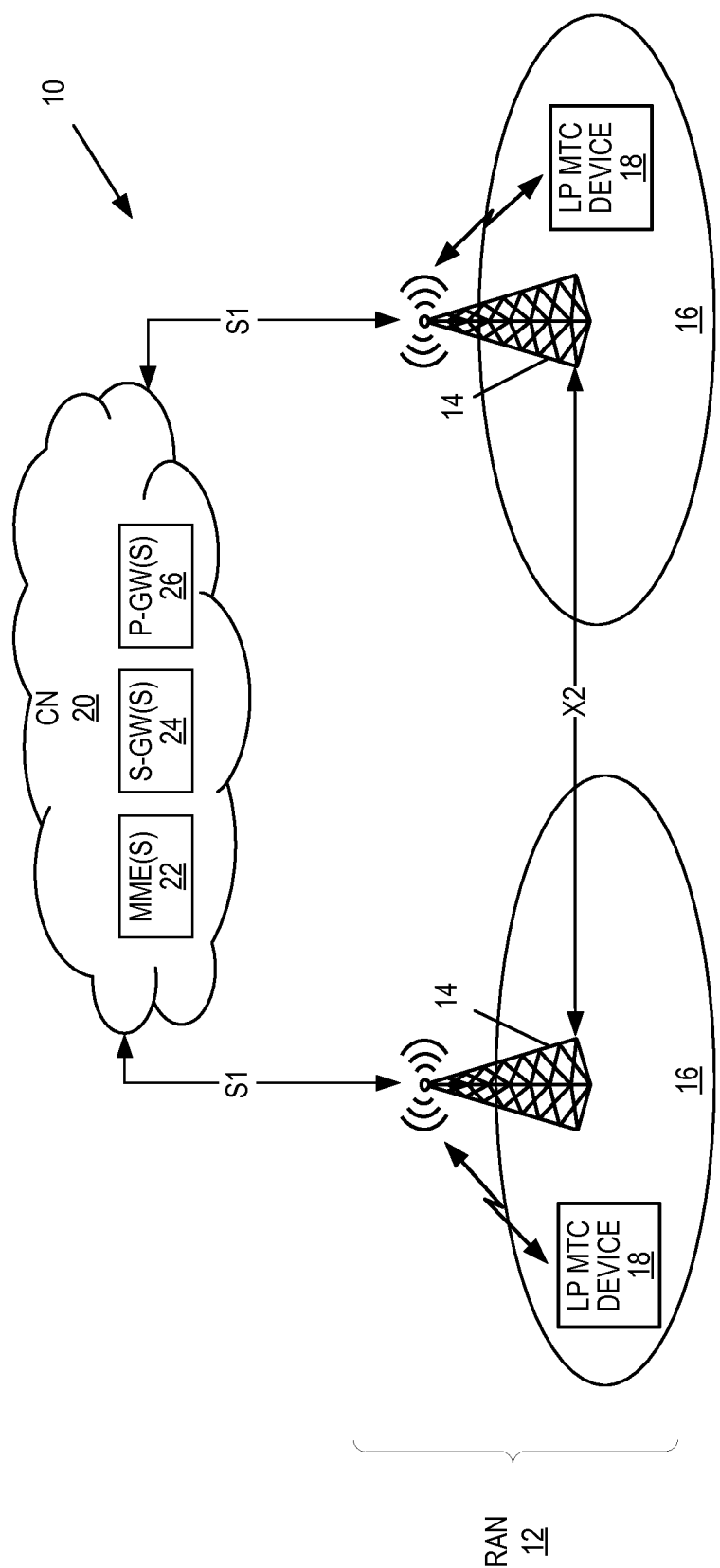
FIG. 3 illustrates one example of a cellular communications network in which a detection mechanism for detecting abnormal signaling patterns for low power consumption wireless devices is implemented according to some embodiments of the present disclosure.

In this regard, FIG. 3 illustrates one example of a cellular communications network 10 in which core network filtering is implemented according to some embodiments of the present disclosure. In this particular example, the cellular communications network 10 is a 3GPP LTE network; however, the concepts disclosed herein are not limited thereto. As illustrated, the cellular communications network 10 includes a Radio Access Network (RAN) 12 including a number of base stations 14 (e.g., eNBs in 3GPP terminology) that serve corresponding cells 16. In this example, the cellular communications network 10 includes a number of Low-Power (LP) consumption MTC devices 18 (LP MTC devices 18). In the embodiments described herein, the LP MTC devices 18 are MTC devices 18 that are capable of PSM operation and/or eDRX operation. As such, the LP MTC devices 18 are sometimes referred to herein as PSM-capable devices and/or eDRX-capable devices. While only two LP MTC devices 18 are shown in FIG. 3 for clarity, the cellular communications network 10 may include many LP MTC devices 18. It should also be noted that while the discussion herein focuses on LP MTC devices 18, the concepts disclosed herein are equally applicable to any wireless device (i.e., is not limited to MTC devices or low-power consumption MTC devices).

The exemplifying base stations 14 are connected via a base-station-to-base-station interface (the X2 interface in 3GPP LTE). In addition, the base stations 14 are connected to a Core Network (CN) 20 (via S1 interfaces in 3GPP LTE). The CN 20 includes a number of CN nodes, which in 3GPP LTE includes one or more Mobility Management Entities (MMEs) 22, one or more Serving Gateways (S-GWs) 24, and one or more Packet Data Network Gateways (P-GWs) 26.

According to embodiments of the present disclosure, a detection mechanism for detecting an abnormal signaling pattern for signaling aimed at, or directed to, the LP MTC devices 18 is implemented in the CN 20. The detection mechanism may be implemented in an existing CN node such as, for example, the MME 22 or may be implemented in a new CN node such as, for example, a new standalone CN node. In the embodiments described below, the detection mechanism is implemented in the MME 22; however, the present disclosure is not limited thereto. Again, while the discussion herein focuses on the LP MTC devices 18, the embodiments described herein are more generally applicable to low-power consumption wireless devices and even more generally applicable to wireless devices.

Figure 4:
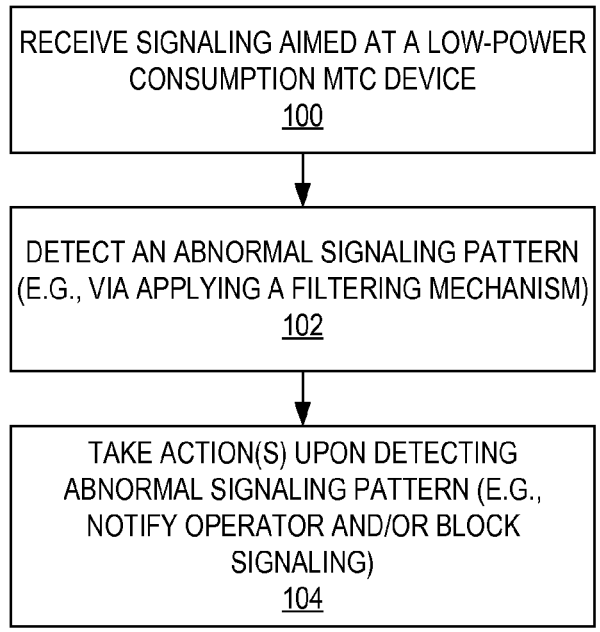
FIG. 4 is a flow chart that illustrates the operation of a core network node according to some embodiments of the present disclosure.

In this regard, FIG. 4 is a flow chart that illustrates the operation of the MME 22 (or more generally a CN node) to utilize a detection mechanism according to some embodiments of the present disclosure. As illustrated, the MME 22 receives signaling aimed at, or directed to, a LP MTC device 18 (step 100). The signaling aimed at the LP MTC device 18 is, in general, any signaling that would result in paging the LP MTC device 18. For example, the signaling may include downlink data notifications received from the S-GW 24, signaling relating to a Mobile Terminating (MT) Short Messaging Service (SMS) message directed to the LP MTC device 18, signaling relating to a MT call directed to the LP MTC device 18, or the like. The MME 22 processes the received signaling to detect an abnormal signaling pattern (step 102). The received signaling may include a current signaling message and, in some cases, one or more previous signaling messages. The abnormal signaling pattern is a signaling pattern that would result in an increase in power consumption at the wireless device beyond a predefined power consumption level. The predefined power consumption level is a power consumption level that is significantly more than an expected power consumption level (e.g., the power consumption level that corresponds to the expected battery lifetime of the LP MTC device 18). In some embodiments, the MME 22 detects an abnormal signaling pattern by applying, to the received signaling, a filtering mechanism for detection of an abnormal signaling pattern. In general, a detection mechanism (e.g., the filtering mechanism) used to detect an abnormal signaling pattern is defined or configured such that the detection mechanism detects signaling patterns that would cause the power consumption of the LP MTC device 18 to be significantly increased as compared to what is expected, regardless of whether the harmful signaling pattern is a result of intentional (malicious) activity or unintentional activity (e.g., poor MTC application implementation). In other words, the detection mechanism operates to protect against excessive network induced signaling towards the LP MTC device 18.

In some embodiments, the detection mechanism is configurable such that, for example, the detection mechanism can be updated over time as new abnormal signaling patterns are identified. Further, in some embodiments, the detection mechanism is a function of one or more characteristics of the LP MTC device 18 and/or one or more characteristics of an MTC application used by the LP MTC device 18. For example, if the LP MTC device 18 is a PSM-capable device, the detection mechanism may be a function of one or more PSM parameters configured for the LP MTC device 18 such as, for instance, the Active Time value configured for the LP MTC device 18 and/or the periodic Tracking Area Update (pTAU)/periodic Routing Area Update (pRAU) Timer value for the LP MTC device 18. Thus, in one particular example, the detection mechanism operates to detect an abnormal signaling pattern in which the LP MTC device 18 is repeatedly signaled (e.g., repeatedly paged) before the Active Time has expired such that the LP MTC device 18 is prevented from entering PSM. As another example, if the LP MTC device 18 is an eDRX-capable device, the detection mechanism may be a function of one or more eDRX parameters configured for the LP MTC device 18 such as, for instance, the eDRX cycle configured for the LP MTC device 18. Thus, in one particular example, the detection mechanism operates to detect an abnormal signaling pattern in which the LP MTC device 18 is repeatedly signaled (e.g., paged) during the DRX ON duration such that the LP MTC device 18 does not enter DRX (i.e., does not transition to DRX OFF state). In other words, the LP MTC device 18 is repeatedly signaled (e.g., paged) at POs during multiple, potentially consecutive, eDRX cycles. As yet another example, based on International Mobile Station Equipment Identity (IMEI) or International Mobile Subscriber Identity (IMSI) different downlink data signaling frequency could be expected due to, e.g., certain LP MTC devices 18 (identified by IMEI or IMSI) may be detected to certain applications.

As yet another example, the detection mechanism may be a function of some identity of the LP MTC device 18 (e.g., IMEI number, an IMEI software version (IMEIsv), an IMEIsv series number, an IMSI number, or an IMSI series number of the LP MTC device 18). Note that the detection mechanism may be a function directly of the IMEIsv or IMESsv series of the LP MTC device 18 or a function of a characteristic(s) of the LP MTC device 18 that is directly or indirectly related to the IMEIsv and/or the IMEIsv series of the wireless device 18. In this manner, different detection mechanisms may be defined or configured for different types of LP MTC devices. For example, a first detection mechanism (which may include one or more filters for detecting one or more different abnormal signaling patterns) may be defined or configured for a first type of LP MTC devices (e.g., gas meter MTC devices) and a second (different) detection mechanism (which may include one or more filters for detecting one or more different abnormal signaling patterns) may be defined or configured for a second type of LP MTC devices (e.g., prisoner tracking MTC devices).

Note that the mechanism to detect the abnormal signaling pattern may be more or less complex. For example, in some embodiments, the detection mechanism includes hysteresis with respect to when to allow signaling to again get through to the LP MTC device 18 (i.e., when to un-block the signaling aimed at the LP MTC device 18) and/or filtering within the detection mechanism that enables correct signaling (i.e., non-abnormal signaling) to get through to the LP MTC device 18 (e.g., based on time when correct signaling is anticipated) while blocking, or discarding, abnormal signaling.

Upon detecting an abnormal signaling pattern, the MME 22 takes one or more actions that mitigate power consumption at the wireless device as a result of the abnormal signaling pattern (step 104). While the one or more actions may include any desired action(s), some examples of the action(s) that may be taken include: notifying the network operator and/or blocking (i.e., discarding) signaling to the LP MTC device 18. As an example, in some embodiments, upon detecting an abnormal signaling pattern, the MME 22 may first notify the network operator. If the abnormal signaling pattern continues for some defined or configured amount of time after notifying the network operator, the MME 22 may then block signaling aimed at the LP MTC device 18. The MME 22 may block all signaling aimed at the LP MTC device 18 or may only block signaling that falls within the detected abnormal signaling pattern. By taking the action(s), battery draining at the LP MTC device 18 as a result of the abnormal signaling pattern can be mitigated.

Figure 5:
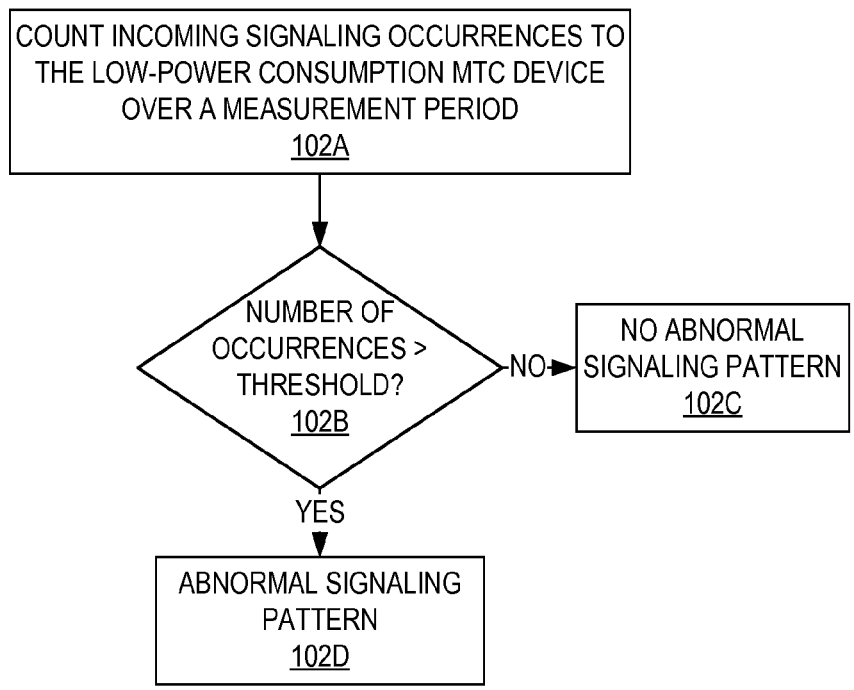
FIG. 5 is flow chart that illustrates a process for detecting an abnormal signaling pattern according to some embodiments of the present disclosure.

While the details of the detection mechanism may vary depending on the particular implementation, FIG. 5 is a flow chart that illustrates one example of the detection mechanism applied in step 102 of FIG. 4 according to some embodiments of the present disclosure. As illustrated, the MME 22 counts the number of incoming signaling occurrences aimed at the LP MTC device 18 over a measurement period (step 102A). In some embodiments, the signaling occurrences are only those signaling occurrences that result in paging the LP MTC device 18. However, in other embodiments, the signaling occurrences may include signaling messages that do not necessarily result in paging the LP MTC device 18. The measurement period may be predefined or configurable. For example, if the signaling being monitored includes downlink data notifications received from the S-GW 24, then the MME 22 counts the number of downlink data notifications received for the LP MTC device 18 during the measurement period. If the number of incoming signaling occurrences for signaling aimed at the LP MTC device 18 over the measurement period is not greater than a threshold (step 102B; NO), the MME 22 determines that no abnormal signaling pattern has been detected (step 102C). However, if the number of incoming signaling occurrences for signaling aimed at the LP MTC device 18 over the measurement period is greater than the threshold (step 102B; YES), the MME 22 determines that an abnormal signaling pattern has been detected (step 102D). The threshold in step 102B may be predefined or configurable.

Using the detection mechanism described herein, both intentional and unintentional excessive signaling to and from LP MTC devices 18 triggered by the network may be avoided. Considering the constraints of the LP MTC device 18, detection and filtering in the LP MTC device 18 (and not in a MME 22 as is the case for embodiments of the present disclosure) will affect the lifetime of the LP MTC device 18, even if more computationally expensive operations are avoided, and is therefore non-desirable. Moreover, detection performed at the MTC service provider would be reactive as it will detect anomalies based on data received from the LP MTC device 18, and not data targeted at the LP MTC device 18. As such, detection at the MTC service provider is also less than ideal.

Positioning the detection mechanism in the CN 20 enables proactive, rather than reactive, filtering/detection of abnormal signaling patterns. Also, since the characteristics of the LP MTC device 18 are readily available as input to a detection mechanism, filtering can be more accurate. Finally, as greater resources are available in the CN 20 than in the LP MTC device 18, more advanced detection mechanisms can be used. The CN detection mechanism described herein will mitigate non-desirable draining of the batteries of the LP MTC devices 18 such that the actual battery lifetimes of the LP MTC devices 18 will not significantly depart from the expected battery lifetimes of the LP MTC devices 18. As a result, many critical applications like fire alarms and prisoner tracking will continue to work for their expected battery lifetimes.

Figure 6:
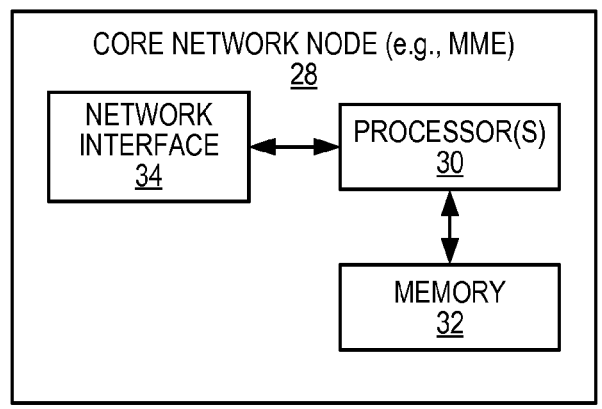
FIGS. 6 and 7 are block diagrams of example embodiments of a core network node.

FIG. 6 is a schematic block diagram of a CN node 28 according to some embodiments of the present disclosure. In some embodiments, the CN node 28 is the MME 22, but it not limited thereto. As illustrated, the CN node 28 includes one or more processors 30 (e.g., Central Processing Units (CPUs), Application Specific Integrated Circuits (ASICs), Field Programmable Gate Arrays (FPGAs), and/or the like), memory 32, and a network interface 34. In some embodiments, the functionality of the CN node 28 (e.g., the detection mechanism) described herein may be fully or partially implemented in software that is, e.g., stored in the memory 32 and executed by the processor(s) 30.

In some embodiments, a computer program including instructions which, when executed by at least one processor, causes the at least one processor to carry out the functionality of the CN node 28 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7:
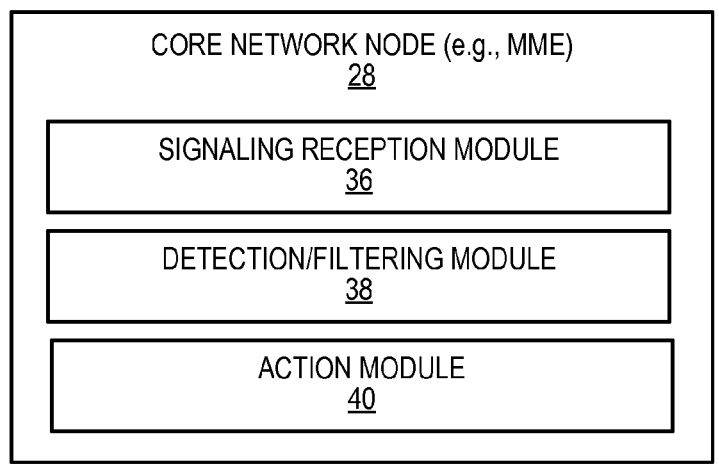

FIG. 7 is a schematic block diagram of the CN node 28 according to some other embodiments of the present disclosure. The CN node 28 includes a signaling reception module 36, a detection/filtering module 38, and an action module 40, each of which is implemented in software. The signaling reception module 36 operates to receive (via a network interface of the CN node 28, which is not illustrated in FIG. 7) signaling aimed at the LP MTC device 18, as described above. The detection/filtering module 38 operates to apply, to the received signaling, a detection mechanism for detecting an abnormal signaling pattern, as described above. The action module 40 operates to take one or more actions upon the detection of an abnormal signaling pattern for the signaling aimed at the LP MTC device 18, as described above.

The following acronyms are used throughout this disclosure.

3GPP 3$^{rd}$ Generation Partnership Project
5G Fifth Generation
AS Access Stratum
ASIC Application Specific Integrated Circuit
BSC Base Station Controller
CN Core Network
CPU Central Processing Unit
DRX Discontinuous Reception
eDRX Extended Discontinuous Reception
eNB Enhanced or Evolved Node B
FPGA Field Programmable Gate Array
GSM Global System for Mobile Communications
IMEIsv International Mobile Station Equipment Identity Software Version
IMSI International Mobile Subscriber Identity
IoT Internet of Things
IP Internet Protocol
LP Low-Power
LTE Long Term Evolution
MME Mobility Management Entity
MO Mobile Originating
MS Mobile Station
MT Mobile Terminating
MTC Machine Type Communication
NAS Non-Access Stratum
PDCCH Physical Downlink Control Channel
P-GW Packet Data Network Gateway
PO Paging Occasion
pRAU Periodic Routing Area Update
PSM Power Saving Mode
pTAU Periodic Tracking Area Update
RAN Radio Access Network
RNC Radio Network Controller
S-GW Serving Gateway
SMS Short Messaging Service
UE User Equipment
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a core network node in a cellular communications network, comprising:
   receiving signaling aimed at a wireless device;
   detecting, via a detection mechanism of the core network node, an abnormal signaling pattern based on the received signaling, the abnormal signaling pattern being a signaling pattern that would result in an increase in power consumption at the wireless device beyond a predefined power consumption level;
   responsive to detecting the abnormal signaling pattern, executing one or more actions that mitigate power consumption at the wireless device as a result of the abnormal signaling pattern, wherein executing the one or more actions upon detecting the abnormal signaling pattern comprises blocking at least one of the received signaling comprising the abnormal signaling pattern and subsequent signaling comprising the abnormal signaling aimed at the wireless device;
   during blocking the at least one of the received signaling comprising the abnormal signaling pattern and subsequent signaling comprising the abnormal signaling pattern aimed at the wireless device, receiving non-abnormal signaling aimed at the wireless device; and
   allowing the non-abnormal signaling aimed at the wireless device to be delivered to the wireless device while continuing to block abnormal signaling aimed at the wireless device.

2. The method of claim 1 wherein the detection mechanism is a filtering mechanism.

3. The method of claim 1 wherein the detection mechanism is configurable.

4. The method of claim 1 wherein the detection mechanism is a function of at least one characteristic of the wireless device.

5. The method of claim 4 wherein the at least one characteristic of the wireless device comprises at least one of: an International Mobile Station Equipment Identity software version, IMEIsv, of the wireless device or a characteristic that is directly or indirectly related to the IMEIsv of the wireless device.

6. The method of claim 4 wherein the at least one characteristic of the wireless device comprises at least one of: an International Mobile Station Equipment Identity software version, IMEIsv, series of the wireless device or a characteristic that is directly or indirectly related to the IMEIsv series of the wireless device.

7. The method of claim 4 wherein the at least one characteristic of the wireless device comprises at least one of: an International Mobile Station Equipment Identity, IMEI, of the wireless device or a characteristic that is directly or indirectly related to the IMEI of the wireless device.

8. The method of claim 4 wherein the at least one characteristic of the wireless device comprises an International Mobile Subscriber Identity, IMSI, of the wireless device.

9. The method of claim 4 wherein the at least one characteristic of the wireless device comprises an International Mobile Subscriber Identity, IMSI, series of the wireless device.

10. The method of claim 1 wherein the wireless device is a Power Saving Mode, PSM, capable wireless device, and detecting an abnormal signaling pattern comprises detecting an abnormal signaling pattern in which the wireless device is repeatedly signaled before an Active Time has expired, the Active Time being a configurable period of time that the wireless device keeps a radio of the wireless device active after transitioning from CONNECTED mode to IDLE mode before entering PSM.

11. The method of claim 1 wherein the wireless device is an extended Discontinuous Reception (eDRX) capable wireless device, and detecting an abnormal signaling pattern comprises detecting an abnormal signaling pattern in which the wireless device is repeatedly signaled at paging occasions during multiple eDRX cycles.

12. The method of claim 1 wherein detecting an abnormal signaling pattern comprises:
counting a number of incoming signaling occurrences to the wireless device over a measurement period; and
detecting an abnormal signaling pattern if the number of incoming signaling occurrences to the wireless device over the measurement period is greater than a predefined threshold.

13. The method of claim 1 wherein the signaling aimed at the wireless device comprises signaling that results in paging the wireless device.

14. The method of claim 1 wherein executing the one or more actions responsive to detecting the abnormal signaling pattern further comprises notifying a network operator of the abnormal signaling pattern detected for the wireless device.

15. The method of claim 1 wherein the wireless device is a Power Saving Mode, PSM, capable wireless device.

16. The method of claim 1 wherein the wireless device is an extended Discontinuous Reception, eDRX, capable wireless device.

17. The method of claim 15 wherein the wireless device is a Machine Type Communication, MTC, device.

18. The method of claim 1 wherein the core network node is a Mobility Management Entity, MME.

19. A core network node in a cellular communications network, comprising:
a network interface;
one or more processors; and
memory storing instructions executable by the one or more processors that when executed by the one or more processors causes the one or more processors to operate to:
receive, via the network interface, signaling aimed at a wireless device;
detect, via a detection mechanism, an abnormal signaling pattern based on the received signaling, the abnormal signaling pattern being a signaling pattern that would result in an increase in power consumption at the wireless device beyond a predefined power consumption level;
execute one or more actions responsive to detecting the abnormal signaling pattern, the one or more actions being one or more actions that mitigate power consumption at the wireless device as a result of the abnormal signaling pattern, wherein executing the one or more actions upon detecting an abnormal signaling pattern comprises blocking at least one of the received signaling comprising the abnormal signaling pattern and subsequent signaling comprising the abnormal signaling aimed at the wireless device;
during blocking the at least one of the received signaling comprising the abnormal signaling pattern and subsequent signaling comprising the abnormal signaling pattern aimed at the wireless device, receive non-abnormal signaling aimed at the wireless device; and
allow the non-abnormal signaling aimed at the wireless device to be delivered to the wireless device while continuing to block abnormal signaling aimed at the wireless device.

20. A non-transitory computer-readable medium comprising executable instructions that when executed by one or more processors of a core network node of a cellular communications network cause the core network node to operate to:
receive signaling aimed at a wireless device;
detect, via a detection mechanism, an abnormal signaling pattern based on the received signaling, the abnormal signaling pattern being a signaling pattern that would result in an increase in power consumption at the wireless device beyond a predefined power consumption level;
execute one or more actions responsive to detecting the abnormal signaling pattern, the one or more actions being one or more actions that mitigate power consumption at the wireless device as a result of the abnormal signaling pattern, wherein executing the one or more actions upon detecting an abnormal signaling pattern comprises blocking at least one of the received signaling comprising the abnormal signaling pattern and subsequent signaling comprising the abnormal signaling aimed at the wireless device;
during blocking the at least one of the received signaling comprising the abnormal signaling pattern and subsequent signaling comprising the abnormal signaling pattern aimed at the wireless device, receive non-abnormal signaling aimed at the wireless device; and allow the non-abnormal signaling aimed at the wireless device to be delivered to the wireless device while continuing to block abnormal signaling aimed at the wireless device.

21. The method of claim 2, wherein the filtering mechanism comprises a plurality of filters, each filter of the plurality of filters configured to detect a different abnormal signaling pattern; and wherein detecting the abnormal signaling pattern comprises detecting the abnormal signaling pattern using a filter of the plurality of filters, the filter configured to detect the abnormal signaling pattern.

22. The method of claim 21, wherein each filter of the plurality of filters is associated with a different type of wireless device; and wherein the filter configured to detect the abnormal signaling pattern is associated with a type of the wireless device.

\* \* \* \* \*